(12) United States Patent
Xiong et al.

(10) Patent No.: US 10,336,420 B2
(45) Date of Patent: Jul. 2, 2019

(54) SINGLE-JOINT UNDERWATER ROBOT FISH (71) Applicant: BOYA GONGDAO (BEIJING) ROBOT TECHNOLOGY Co., Ltd., Beijing (CN)

(72) Inventors: Minglei Xiong, Beijing (CN); Yang Li, Beijing (CN); Shanshan Jiang, Beijing (CN); Jie Zhang, Beijing (CN); Jian Wang, Beijing (CN)

(73) Assignee: BOYA GONGDAO (BEIJING) ROBOT TECHNOLOGY CO., LTD., Beijing (CN)

( * ) Notice: Subject to any disclaimer, the term of this patent is extended or adjusted under 35 U.S.C. 154(b) by 218 days.

(21) Appl. No.: 15/536,317

(22) PCT Filed: Apr. 28, 2017

(86) PCT No.: PCT/CN2017/082447
§ 371 (c)(1),
(2) Date: Jun. 15, 2017

(87) PCT Pub. No.: WO2018/195918
PCT Pub. Date: Nov. 1, 2018

(65) Prior Publication Data
US 2019/0100294 A1   Apr. 4, 2019

(51) Int. Cl.
*B63H 1/36*   (2006.01)
*B63C 11/52*   (2006.01)
*B25J 11/00*   (2006.01)

(52) U.S. Cl.
CPC ............. *B63H 1/36* (2013.01); *B25J 11/00* (2013.01); *B63C 11/52* (2013.01)

(58) Field of Classification Search
CPC ............. B63H 1/36; B25J 11/00; B63C 11/52
See application file for complete search history.

(56) References Cited

U.S. PATENT DOCUMENTS 5,344,357 A * 9/1994 Lyczek ................. A63H 23/10
446/154
6,138,604 A * 10/2000 Anderson ................ B63G 8/08
114/332

(Continued)

FOREIGN PATENT DOCUMENTS

CN   1480300 A   3/2004
CN   102039994 A   5/2011

(Continued)

*Primary Examiner* — Stephen P Avila
(74) *Attorney, Agent, or Firm* — Craft Chu PLLC; Andrew W. Chu (57) ABSTRACT

The single-jointed underwater robot fish includes a casing, a main board cabin, a motion control cabin and a battery cabin. The outer contour of the casing is a bionic fish shape, one end is a front casing, and the other end is a bionic fishtail structure. The front end of the main board cabin is affixed to the inner side of the front casing, a lens group, an eccentric anti-shake mechanism and a main PCB (printed circuit board) are set in the main board cabin. The motion control cabin is connected to the rear end of the main board cabin. A triaxial linkage device and a transmission device are set in the motion control cabin. The battery cabin is located below the motion control cabin.

12 Claims, 7 Drawing Sheets

(56) References Cited

U.S. PATENT DOCUMENTS

| | | | | |
|---|---|---|---|---|
| 2004/0092200 A1* | 5/2004 | Ishimoto | ................ | A63H 23/04 |
| | | | | 446/153 |
| 2005/0235898 A1* | 10/2005 | Hobson | ................ | B60F 3/0007 |
| | | | | 114/312 |
| 2005/0235899 A1* | 10/2005 | Yamamoto | ............. | A63H 23/04 |
| | | | | 114/337 |
| 2006/0196104 A1* | 9/2006 | Lapointe | ................ | A63H 11/00 |
| | | | | 43/42.24 |
| 2013/0017754 A1* | 1/2013 | Lu | .......................... | A63H 33/26 |
| | | | | 446/158 |
| 2015/0224413 A1 | 8/2015 | Mimlitch, III et al. | | |

FOREIGN PATENT DOCUMENTS

| | | | |
|---|---|---|---|
| CN | 105711778 | A | 6/2016 |
| CN | 205801470 | U | 12/2016 |
| JP | 2014520609 | A | 8/2014 |
| KR | 101284430 | B1 | 7/2013 |

* cited by examiner

SINGLE-JOINT UNDERWATER ROBOT FISH

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention relates to the technical field of underwater detection devices, in particular to a single-jointed underwater robot fish.

2. Description of Related Art Including Information Disclosed Under 37 CFR 1.97 and 37 CFR 1.98.

The robot fish has important applications and meets urgent needs in military applications, biological observation and detection in confined spaces, etc., due to its high speed, high efficiency, high camouflage, high mobility and high adaptability. However, due to the limitations of charging, the robot fish cannot perform long-term and long-range tasks in the prior fields, and accordingly, the capacity of the robot fish to perform tasks underwater, and particularly in oceans, is severely limited.

At present, most of the robot fish adopts a multi-joint series drive, which is relatively complex to control, and is not conducive to the operation of the robot fish in water; the robot fish is complex in structure, high in cost and is heavy.

BRIEF SUMMARY OF THE INVENTION

This invention aims to provide a single-jointed underwater robot fish with a long battery life, simple structure and relative flexibility solving the defects in the prior iterations.

The technical scheme is as follows: The single-jointed underwater robot fish, is comprised of:

A casing, where the casing has a fish-shaped contour; one end is the front casing, the other end is a bionic fishtail structure; the front casing and the bionic fishtail structure are connected by an upper casing and a lower casing;

A main board cabin, where the front end of the main board cabin is fit to the front casing, a lens group for collecting images, an eccentric anti-shake mechanism for preventing side shake, and a main PCB for controlling the motion, trajectory, and postures is set in the main board cabin. The lens group is connected to the eccentric anti-shake mechanism;

A motion control cabin; the motion control cabin is connected to the rear of the main board cabin, a triaxial linkage device for realizing balance adjustment to the pitch posture and left-right postures and a transmission device are set in the motion control cabin. The output end of the transmission device is connected to the bionic fishtail structure, and the input of the transmission device is connected with the output of the triaxial linkage device;

A battery cabin: the battery cabin is located below the motion control cabin, the lower end of said battery cabin is fixed to the lower casing, and the battery cabin is used for providing the power supply for the main board cabin and the motion control cabin.

The single-jointed underwater robot fish has benefits as follows: image collection and records are performed by lens group, and an underwater photography function can be realized; two-dimensional side shaking prevention and stable output of images are realized by the eccentric anti-shake mechanism, and adjustment of algorithms of the motion trajectory and postures is realized by the main PCB; balance adjustment of the pitch and left-right postures of the robot fish is realized by the triaxial linkage device; multi-posture swings of the bionic fishtail structure can be realized by the transmission device; the single-jointed underwater robot fish can perform water quality monitoring, food and tablet delivery, underwater engineering approval, underwater salvage and maritime rescue, sea (river and lake) bed surveying and mapping, underwater metal flaw detection and other functions by using a variety of equipment.

On the basis of the technical scheme, this invention can also be modified as follows.

Further, the front casing and the upper casing, the front casing and the lower casing, as well as, the upper casing and the lower casing, are all sealed connections, and the bionic fishtail structure, with one end penetrating a joint between the upper casing and the lower casing, is located in the casing.

The technical scheme has benefits as follows: the front casing, the upper and lower casings, constituting the casing, are all sealed connections: no water can flow into the casing when the robot fish travels in water, and accordingly, the sealing performance of the entire casing is guaranteed; the outer contour of the whole casing is designed in a bionic manner, threat factors are avoided, a fish shoal effect can be produced, and the purpose of fish shoal detection can be achieved.

Further, the main board cabin is defined by a main board cabin casing and a cover board, where a first hole allowing the lens group to collect images is formed in the front end of the main board cabin casing, an infrared distance meter is mounted under the first hole, illuminating lamps are set, symmetrically, on both sides of the infrared distance meter, indicator lamps are set above the first hole, an acoustic microphone is mounted at the lower end of the main board cabin casing, the eccentric anti-shake mechanism is affixed to the bottom of the main board cabin, and the lens group is connected with the upper end of the eccentric anti-shake mechanism.

This scheme has benefits as follows: an underwater obstacle avoidance function of the robot fish, can be realized by arranging the infrared distance meter, so the robot fish has a better image collection effect, and can also protect products and enhance product durability; the set illuminating lamps can provide a brighter underwater shooting condition for the lens group; the set acoustic microphone can transmit acoustic instructions to the main board cabin for processing.

Further, the eccentric anti-shake mechanism is comprised of a brushless motor, a U-shaped clamp, a monorail bilateral guard board, a front fan-shaped rail and a backing board which are stacked from bottom to top sequentially; the brushless motor is affixed to the main board cabin casing by a motor fixing seat, the U-shaped clamp is affixed to the upper end of the brushless motor, and the lens group is affixed to the eccentric anti-shake mechanism by the backing board.

Further, an elongated groove, for accommodating the front fan-shaped rail, is formed in the middle of the monorail bilateral guard board, the middle of the front fan-shaped rail is embedded in the elongated groove, and both ends of the front fan-shaped rail are connected to the main board cabin casing by screws.

Further, a waterproof assembly of pressure sensors is further set at the lower end of the main board cabin casing and is comprised of a pressure sensor outer cover as well as an inner ejector board, a pressure sensor PCB and a backing board, which are stacked in the pressure sensor outer cover from bottom to top sequentially.

This scheme has benefits as follows: the pressure sensors of the waterproof assembly can detect water depth, one side of the pressure sensor PCB is connected with the step-type pressure sensor backing board, and the O-ring is set, so that the pressure sensor is prevented from being directly fastened to and being connected with the pressure sensor PCB, and damage to the pressure sensor during mounting is reduced.

Further, the triaxial linkage device is comprised of a bracket, a slider, a crank-link mechanism, a side tilting steering gear and a front-back tilting steering gear; a fixing board is set at the upper part of the bracket, two parallel sliding rods are set at the lower part of the bracket and are sleeved with the slider, the link end of the crank-link mechanism is connected with the slider, the crank end of the crank-link mechanism is connected with the fixing board, the front-back tilting steering gear is affixed at the upper end of the fixing board, and the side tilting steering gear is set at the end of the fixing board.

This scheme has benefits as follows: the triaxial linkage device is fixed in the robot fish by thread fastening, the slider changes front and back due to rotation of the front-back tilting steering gear, and the pitch angle of the robot fish can be changed; the left-right posture of the robot fish is changed by rotation of the side tilting steering engine.

Further, the transmission device comprises a fishtail shaft, a first umbrella gear, a second umbrella gear and an ejector pin, where an ejector pin hole, perpendicular to the fishtail shaft, is formed in the middle of the fishtail shaft. The ejector pin penetrates the ejector pin hole and is connected to the fishtail shaft by a screw; an ejector pin sleeve is set outside the ejector pin and connected with the bionic fishtail structure; the first umbrella gear is located at one end of the fishtail shaft, and the second umbrella gear is engaged with the first umbrella gear and connected with an output shaft from a fishtail steering engine.

The scheme has benefits as follows: the single-jointed underwater robot fish has an underwater rescue function and has the capacity to cause a 100 kg object to float up and down with the aid of the transmission device and the triaxial linkage device, and the underwater rescue effect can be achieved.

Further, the bionic fishtail structure is comprised of a colloidal fishtail and a steel board, where the steel board is set in the colloidal fishtail, and an embedded component in the fishtail is connected to the end, located outside the colloidal fishtail, of the steel board and is connected with the ejector pin sleeve by a fishtail shaft seat.

This scheme has benefits as follows: the first umbrella gear is fixed with the fishtail shaft by screws, the second umbrella gear is fixed with the fishtail steering engine by screws, and the first umbrella gear and the second umbrella gear are engaged to realize transmission of power, the steering direction of the steering gears is changed to vertical transmission, and internal space of the motion control cabin is saved; the ejector pin, the ejector pin sleeve, and the embedded components of the fishtail are set and can allow rapid disassembly of a fishtail.

Further, the battery cabin is comprised of a battery cabin casing, a battery cover as well as a battery, a power management PCB and a USB circuit board which are set in the battery cabin; a USB port connected to the USB circuit board is set on one side of the battery cabin casing, and the power management PCB is connected with the battery cover by ejector pins.

This scheme has benefits as follows: a charging function of the battery and an extraction function of data of users can be achieved by the USB port, and the battery can provide a stable power supply for the robot fish by the power management PCB.

Further, the second hole, corresponding to the first hole, is formed at the front of the front casing. A lens hood is set outside the first hole and penetrates the second hole.

Further, the single-jointed robot fish also contains a sonic remote control, where the sound wave remote control is provided with a plurality of keys, a circuit board is set in the sonic remote control, and switching elements on the circuit board are set between the plurality of keys and the circuit board.

DETAILED DESCRIPTION OF THE INVENTION

In the Figures, the components represented by reference numbers are listed as follows:

110, front casing; 111, second through hole; 120, bionic fishtail structure; 121, colloid fishtail; 122, steel board; 123, fish tail embedded component; 124, shaft seat; 130, upper casing; 140, lower casing; 200, main board cabin; 210, main board cabin casing; 211, first through hole; 211a, lens hood; 212, infrared distance meter; 212a, infrared cover; 213, illuminating lamp; 213a, illuminating lamp shade; 214, indicator lamp; 214a, illuminating lamp shade; 215, acoustic microphone; 215a, acoustic microphone holder; 216, waterproof assembly of pressure sensor; 216a, pressure sensor outer cover; 216b, pressure sensor PCB; 216c, pressure sensor inner ejector board; 216d, pressure sensor backing board; 217, antenna tube connecting sleeve; 220, cover board; 230, lens group; 231, lens fixing board; 240, eccentric anti-shake mechanism; 241, brushless motor; 242, U-shaped clamp; 243, monorail bilateral guard board; 244, front fan-shaped rail; 245, backing board; 300, motion control cabin; 310, motion control cabin casing; 320, motion control cabin cover board; 330, triaxial linkage device; 331, bracket; 332, crank; 333, link; 334, slider; 335, sliding rod; 336, front-back tilting steering engine; 337, side tilting steering engine; 340, transmission device; 341, fishtail steering engine; 342, second umbrella gear; 343, first umbrella gear; 344, fishtail shaft; 345, ejector pin; 346, ejector pin sleeve; 347, spring; 350, switching assembly; 400, battery cabin; 401, battery cabin casing; 402, battery cover; 403, battery; 404, power management PCB; 405, USB circuit board; 405a, USB port; 406, spring ejector pin; 407, electric board of spring ejector pin; 408, silica gel O-ring; 500, sound wave remote control; 510, upper casing cover; 511, key; 512, waterproof film; 520, lower casing cover; 521, battery baffle; 522, silicone plug; 530, circuit board; 531, switching element, 540, charging board; 550, buzzer; 560, supply battery.

Detailed Implementation Method

Principles and features of this invention, are described below with reference to the accompanying drawings, and all illustrations are used only for explaining the invention instead of limiting the scope of the invention.

Figure 1:
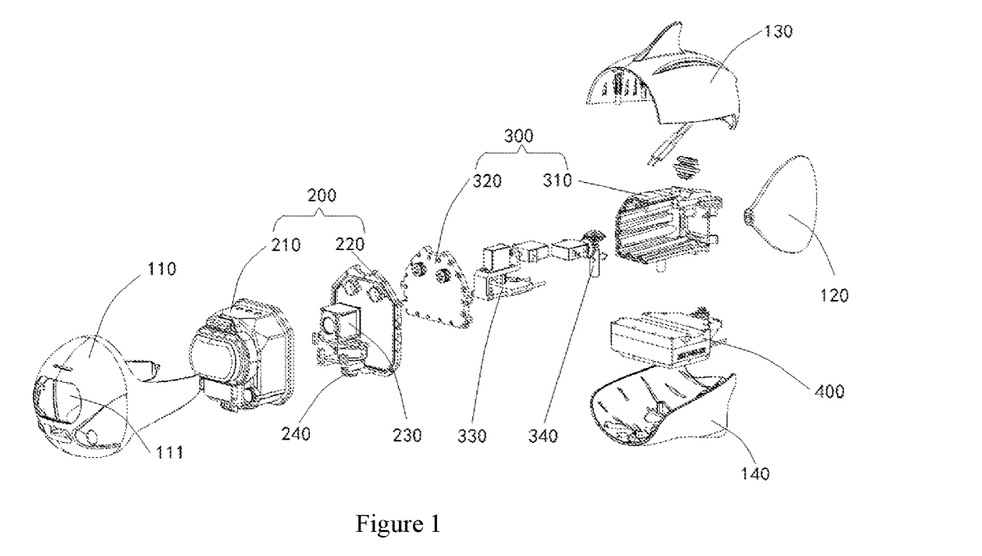
FIG. 1 is an exploded perspective view of the single-jointed underwater robot fish.

As shown in FIGS. 1 to 9, a single-jointed underwater robot fish, is comprised of:

A casing; the outer contour of the casing is a bionic fish shape, one end is a front casing 110, the other end is in a bionic fishtail structure 120, and the front casing 110 and the bionic fishtail structure 120 are connected by an upper casing 130 and a lower casing 140;

A main board cabin 200; the front end of the main board cabin 200 is fitted to the inner side of the front casing 110, a lens group 230 for collecting images, an eccentric anti-side-shake mechanism 240 for preventing side shake and a main PCB for controlling the motion trajectory and postures is set in the main board cabin 200, and the lens group 230 is connected to the eccentric anti-shake mechanism 240;

A motion control cabin 300; the motion control cabin 300 is connected to the rear of the main board cabin 200, a triaxial linkage device 330 for realizing balance adjustment to the pitch posture and left-right postures and a transmission device 340 are set in the motion control cabin 300. The output end of the transmission device 340 is connected to the bionic fishtail structure 120, and the input of the transmission device 340 is connected with the output of the triaxial linkage device 330;

A battery cabin 400: the battery cabin 400 is located below the motion control cabin 300, the lower end of the battery cabin 400 is fixed to the lower casing 140, and the battery cabin 400 is used for providing the power supply for the main board cabin 200 and the motion control cabin 300.

Compared with prior iterations, the single-jointed underwater robot fish has the advantages that image collection and recording are performed by a set of lenses 230, side shaking prevention and stable output of images are realized by the eccentric anti-shake mechanism 240, and adjustment of algorithms of the motion trajectory and postures is realized by the main PCB; balance adjustment of the pitch posture and left-right postures of the robot fish is realized by the triaxial linkage device 330; multi-position swing of the bionic fishtail structure can be realized by the transmission device 340; the single-jointed underwater robot fish can perform water quality monitoring, food and tablet delivery, underwater engineering approval, underwater salvage and maritime rescue sea (river and lake) bed surveying and mapping, underwater metal flaw detection and other functions by carrying a variety of equipment.

The casing of the robot fish is made of a sealed structure. That is, the front casing 110 and the upper casing 130, the front casing 110 and the lower casing 140, as well as, the upper casing 130 and the lower casing 140 are all sealed connections, and the bionic fishtail structure 120, with one end penetrating a joint of the upper casing 130 and the lower casing 140, is located in the casing. The front casing 110, the upper casing 130, and the lower casing 140, constituting the complete casing are all sealed connections, no water can flow into the casing when the robot fish travels in water. Accordingly, the sealing performance of the entire casing is guaranteed; the outer contour of the casing is designed in a bionic manner, threat factors are avoided, a fish shoal effect can be produced, and the purpose of fish shoal detection can be achieved. Accordingly, the single-jointed underwater robot fish is brought close the fish shoal by the aid of a fish shoal effect, produced when the robot fish swims in water; the function of fish shoal detection can be performed in combination with images of the lens group 230, and great help is provided for scientific research and aquaculture.

As shown in FIGS. 9 to 13, a power management PCB 404, and spring ejector pins 406, are set in the battery cabin 400 of the machine. The assembly is simple in structure and convenient to mount, a waterproof sealing ring is set between each spring ejector pin 406 and the power management PCB 404, so that the good waterproof performance of the robot fish can be guaranteed, and the assembly is finished with an ejector pin waterproof assembly in the machine. The ejector pin waterproof assembly is arranged between the main board cabin 200 and the motion control cabin 300, as well as, between the motion control cabin 300 and the battery cabin 400. That is, the power management PCB 404 is set in the battery cabin 400, a motion PCB is set in the motion control cabin 300, a control PCB is set in the main board cabin 200, and spring ejector pins 406 are also set in the motion control cabin 300. Accordingly, the power management PCB 404 and the motion PCB are connected by spring ejector pins, and the motion PCB and the control PCB are also connected by spring ejector pins. Preferably, the power management PCB 404, the motion PCB and the control PCB are all Pogopin spring ejector circuit boards, and the spring ejector pins 406 are all Pogopin ejector pins. By means of the structural design, the battery cabin 400, the motion control cabin 300 and the main board cabin 200 can be replaced independently instead of integrated disassembly in case of fault, therefore, cost can be saved, and the economic benefit is improved.

Figure 2:
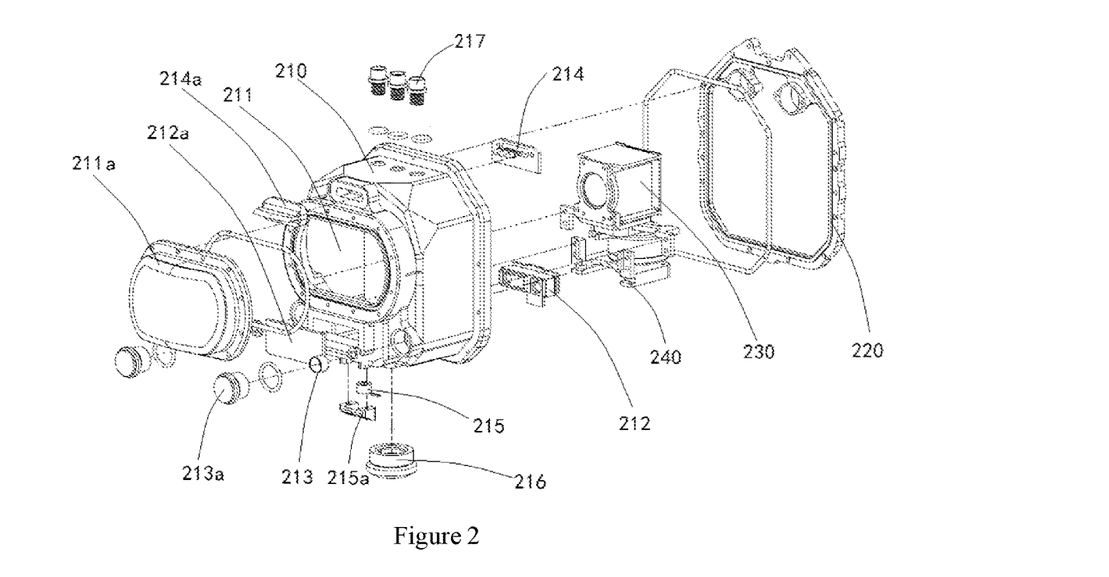
FIG. 2 is an exploded perspective view of the mainboard cabin of the single-jointed underwater robot fish.

FIG. 2 shows an explosive view of the mainboard cabin structure. The mainboard cabin 200 is defined by a main board cabin casing 210 and a cover plate 220. The mainboard cabin casing 210 and the cover plate 220 are fastened by screws, a sealing ring groove is formed between the two parts; a silicone O-ring 408 is placed in the seal ring groove and produces a corresponding amount of compression after screw fastening, achieving overall waterproofing of the cabin. The components and parts are reasonably spaced to be loaded into the main board cabin, and accordingly, the function is waterproof. In the main board cabin casing 220, the lens group 230, the eccentric anti-shake mechanism 240, the waterproof assembly 216 of the pressure sensor, an infrared distance meter 212, bilateral illuminating lamps 213, indicator light 214, an acoustic microphone 215, an acoustic PCB, a main board PCB and other PCBs are included. The first hole 211, allowing the lens group 230 to collect images, is formed in the front end of the main board cabin casing 210, and the first hole 211 is in a quasi-rectangular shape with four corners in an arc and can provide a larger shooting angle for the lens group 230. The infrared distance meter 212 is mounted below the first hole 211 and is used for achieving the underwater obstruction avoidance function of the robot fish, so that the robot fish achieves a better image collection effect, and the infrared distance meter 212 can also play a role in protecting and enhancing product durability. Illuminating lamps 213 are set symmetrically on both sides of the infrared distance meter 212, providing a good underwater shooting condition for the lens group 230; indicator lamps 214 are set above the first hole 211, and the indicator lamp group emits light in different colors after receiving different instructions; the instructions of users are transmitted and fed back to the users in the form of light; an acoustic microphone 215 is mounted at the lower end of the main board cabin casing 210, and records acoustic instructions of the sonic remote control and transmits acoustic instructions to an acoustic processing board of the main board cabin 200; the main PCB realizes adjustments of algorithms of the motion trajectory and postures.

As shown in FIG. 2, a lens hood 211a is set outside the first hole 211; the lens hood 211a is made of a transparent acrylic material to ensure the image collecting effect of the lens group 230; the lens hood 211a and the main board cabin casing 210 are fastened by screws, a sealing ring groove is formed between the two parts, an O-ring is placed in the seal ring groove and produces a corresponding amount of compression after screw fastening, achieving overall waterproofing of the shooting assembly. An upper-end boss (convex platform) of each illumination lampshade 213a is sleeved with an O-ring, and external threads are set outside the corresponding illumination lampshades 213a and are a threaded connection with the main board cabin 200 through corresponding threaded holes; the bosses of the illumination lampshades 213a and the main board cabin 200 extrude the O-rings after tightening to achieve the purpose of waterproofing. The illumination lampshades 213a are made of a transparent material to ensure that the light of lamp beams inside can be emitted.

Figure 3:
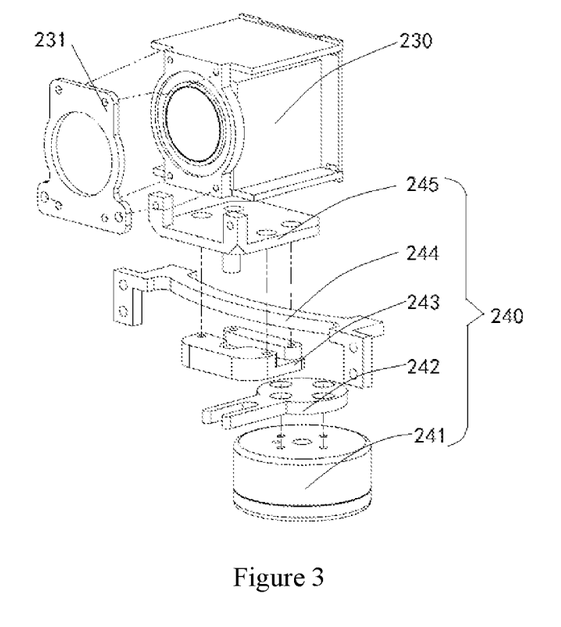
FIG. 3 is an exploded perspective view of an eccentric anti-shake mechanism of the single-jointed underwater robot fish.

As shown in FIG. 3, the eccentric anti-shake mechanism 240 of the machine is fixed to the bottom of the main board cabin casing 210, and the lens group 230 is connected to the upper end of the eccentric anti-shake mechanism 240. The eccentric anti-shake mechanism 240 is comprised of a brushless motor 241, a U-shaped clamp 242, a monorail bilateral guard board 243, a front fan-shaped rail 244 and a backing plate 245 which are stacked from bottom to top sequentially; the brushless motor 241 is fixed to the main board cabin casing 210 through a motor fixing seat 241a, the U-shaped clamp 242 is fixed to the upper end of the brushless motor 241, and the lens group 230 is fixed to the eccentric anti-shake mechanism 240 by the backing plate 245. An elongated groove for accommodating the front fan-shaped rail 244, is formed in the middle of the monorail bilateral guard board 243, the middle of the front fan-shaped rail 244 is embedded in the elongated groove, and both ends of the front fan-shaped rail 244 are connected to the main board cabin casing 210 by screws.

Figure 4:
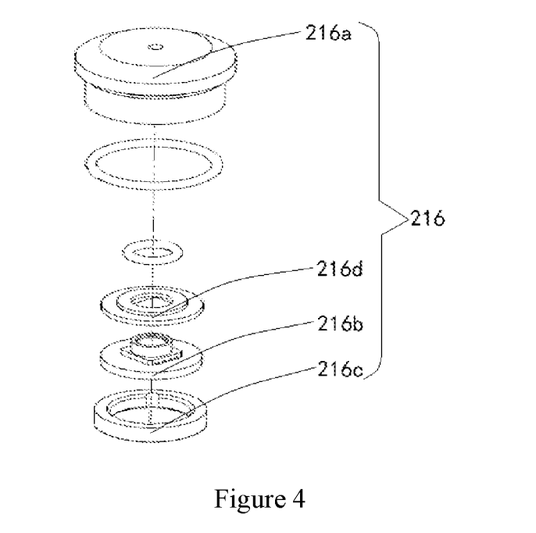
FIG. 4 is an exploded perspective view of the waterproof assembly of pressure sensor of the single-jointed underwater robot fish.

FIG. 4 is an explosive view of the waterproof assembly of the pressure sensor of the single-jointed underwater robot fish, the pressure sensor of the pressure sensor waterproof assembly 216 can detect water depth. The assembly consists of a pressure sensor outer cover 216a, a pressure sensor PCB 216b, a silicone O-ring 406, a pressure sensor inner ejector board 216c and a pressure sensor backing board 216d. The pressure sensor is welded to one side of the pressure sensor PCB 216b, the side is connected to the step-type pressure sensor backing board 216d, which is connected to the O-ring. The pressure sensor is prevented from being directly fastened with the O-ring, and damage to the pressure sensor during installation is reduced. The other side of the pressure sensor PCB 216b is fixed by the pressure sensor inner ejector board 216c, an external thread structure is formed outside the pressure sensor inner ejector board 216c, the pressure sensor inner ejector board 216c is fastened with a pressure sensor outer cover 216a through a thread, extruding into the pressure sensor PCB 216b, which transmits pressure to the pressure sensor backing board 216d; the pressure sensor backing board 216d transmits extrusion force to the silicone O-ring 406, a compression amount is generated between the silicone O-ring 406 and the pressure sensor outer cover 216a, and waterproofing is achieved. The pressure sensor is sensitive and delicate and is easy to damage in installation and use and can affect function.

This structure solves the problem to a great extent, and achieves waterproofing and realization of the function of the pressure sensor. For the structure, when the pressure sensor malfunctions, all that is required is to screw out the outer cover 216a of pressure sensor in the thread direction, and the cover plate 220 of the main board cabin 200 does not need to be disassembled, therefore, quick disassembly is realized, and maintenance time is shortened.

Figure 5:
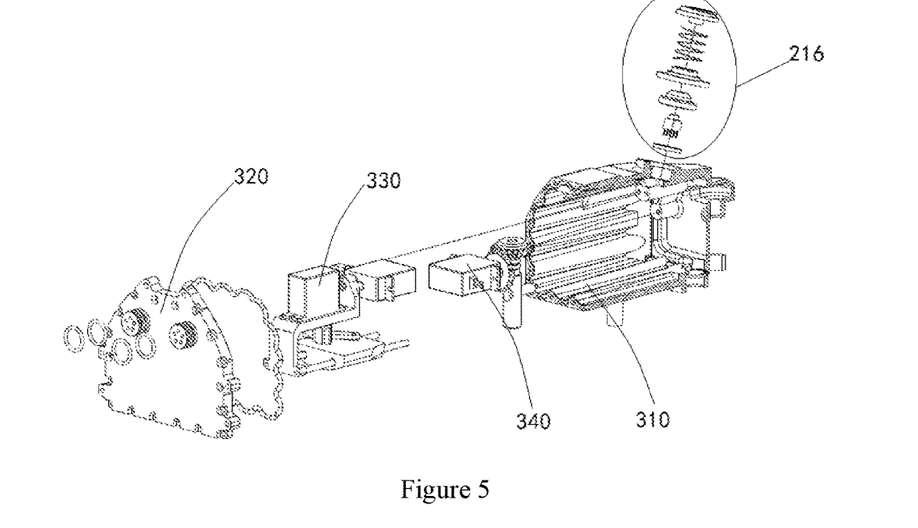
FIG. 5 is an exploded perspective view of the motion control cabin of the single-jointed underwater robot fish.

As shown in FIG. 5, a motion control cabin casing 310, a motion control cabin cover board 320, a transmission device 340, a triaxial linkage device 330, and a plurality of O-rings and screws are included in a cabin body of the motion control cabin 300. The waterproof switch consists of a button, a spring, a silicon sleeve pressure board, a silicone sleeve, a key and a switching PCB, switching on and off of the robot fish underwater and can operate in a waterproof manner; the triaxial linkage device 330 realizes balance adjustment of the fish pitch posture and left and right postures based on a formula calculated.

Figure 6:
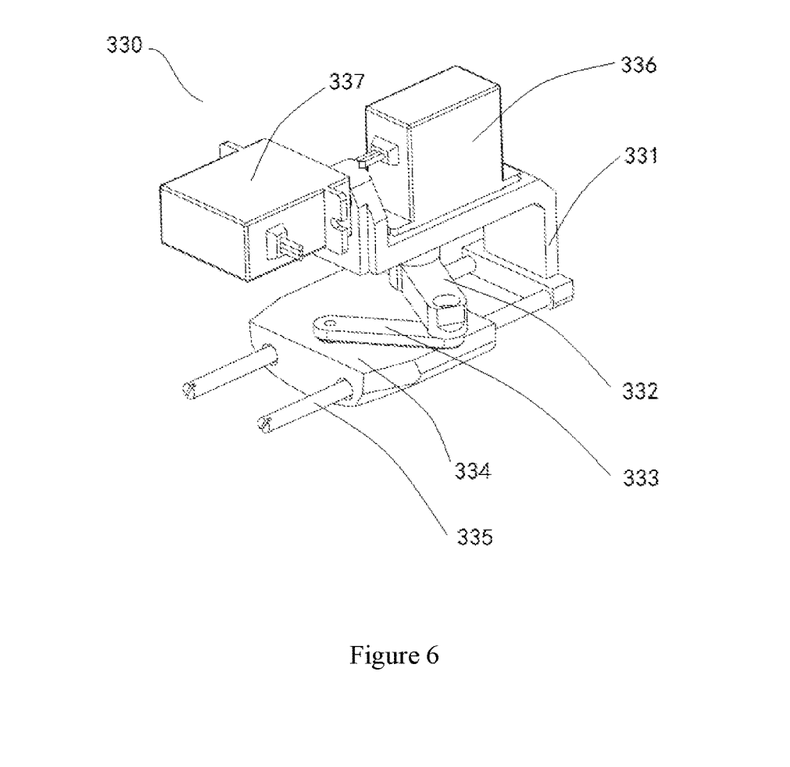
FIG. 6 is a perspective view of a triaxial linkage device of the single-jointed underwater robot fish.

As shown in FIG. 6, the triaxial linkage device 330 is comprised of a bracket 331, a crank 332, a link 333, sliding rods 335, a slider 334, a front-back tilting steering gear 336 and a side tilting steering gear 337. The fixing board is set at the upper part of the bracket 331, two parallel sliding rods 335 are set at the lower part of the bracket 331, the front and back tilting steering gear 336 is fixed with the fixing board by screws, the side tilting steering gear 337 is set at one end of the fixing board, the output gear of the front and back tilting steering gear 336 is fixed with the crank 332 by screws, the crank 332 and the link 333 are fixed by screws, the slider 334 is inserted into an outer extension port of the link 333, two side holes of the slider 334 allow the sliding bars 335 to penetrate; each sliding bar 335 is screwed and fixed with the bracket 331 through a corresponding external thread set at the top of one end; the structure achieves the purpose of limiting the slider 334 after connection, and the slider 334 can only reciprocate in one direction. The steering gears rotate at corresponding angles, force is transmitted layer by layer, and the slider 334 moves in the direction of the sliding bars 335.

The output gear of the side tilting steering gear 337 of the machine is fixed with the bracket 331, and when the side tilting steering gear 337 rotates, the bracket 331 can drive all parts to move circumferentially, and the axis is the same as that of the side tilting steering gear 337.

The mechanism is fixed in the robot fish by thread fastening, the slider 334 changes front and back due to rotation of the front-back tilting steering gear 336, and the pitch angle of the robot fish is changed; the left-right posture of the robot fish is changed by rotation of the side tilting steering engine 337 by the aid of the triaxial linkage device 330. The triaxial linkage device 330 realizes three-dimensional change of the center of gravity by changing the mechanism, thereby realizing the posture change of the robot fish in water, the robot fish can swim in water in a balanced and stable posture and completes the designated action.

Figure 7:
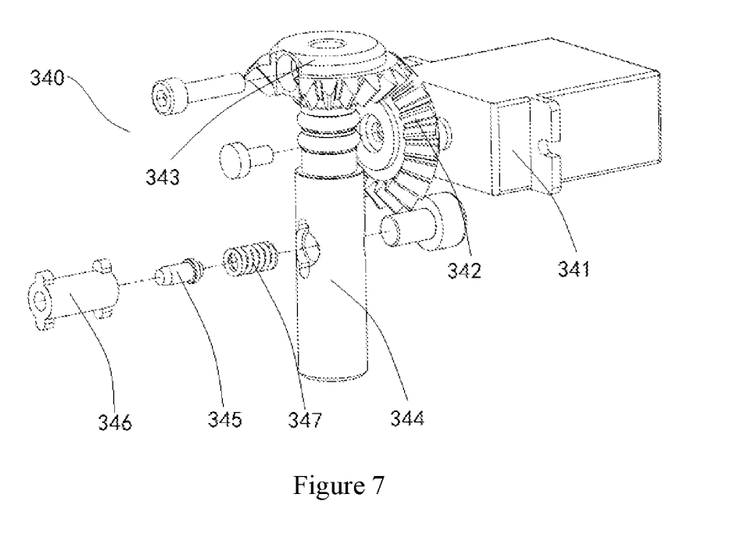
FIG. 7 is an exploded perspective view of the transmission device of the single-jointed underwater robot fish.

As shown in FIG. 7, the transmission device 340 of the machine, comprising a fishtail shaft 344, a first umbrella gear 343, a second umbrella gear 342 and an ejector pin 345, where an ejector pin hole, perpendicular to the fishtail shaft, is formed in the middle of the fishtail shaft 344, the ejector pin 345 penetrates the ejector pin hole and is connected to the fishtail shaft 344 by a screw, an ejector pin sleeve 346 is set outside the ejector pin 345 and connected with the bionic fishtail structure 120, the first umbrella gear 343 is located at one end of the fishtail shaft 344, and the second umbrella gear 342 is engaged with the first umbrella gear 343 and connected with the output shaft of a fishtail steering engine 341. Two O-slots, capable of accommodating O-rings, are formed in the top of the fishtail shaft 344 and cooperate with the motion control cabin 300 to extrude the O-rings, and waterproofing is realized by dynamic seal. The fishtail ejector pin assembly can realize rapid disassembly of the fishtail, the first umbrella gear 343 and the second umbrella gear 342 are engaged to change the transmission direction of the steering gears into vertical transmission, and space in the motion control cabin 300 is saved. The motion control cabin casing 310 and the motion control cabin cover board 320 are sealed by silicone O-ring 406 and are tightened by screws in the periphery, and the silicone O-ring 406 deforms to achieve a seal.

The ejector pin 345 and a spring are mounted in the pin hole in sequence, and mounted on one side of the fishtail shaft 344 together after assembly, and the other side is fixed with the fishtail ejector pin sleeve 346 with an internal thread groove to form the fishtail ejector pin assembly; the spring is extruded, spring force is transmitted to the fishtail ejector pin 345, and accordingly, extension of the fishtail ejector pin 345 is realized. The fishtail ejector pin assembly can realize rapid disassembly of the fishtail, the transmission device 340 changes the transmission direction of the steering gears into vertical transmission, and space in the motion control cabin 300 is saved. The first umbrella gear 343 and the fishtail shaft 344 are fixed by screws, the second umbrella gear 342 and the fishtail steering engine 341 are fixed by screws, and the two gears are engaged to realize power transmission.

In addition, the screw holes at both sides of the fishtail steering engine 341 are used for fixing the screws and the motion control cabin 300. The O-ring of the fishtail shaft 344 and the motion control cabin 300 are dynamically sealed.

Figure 8:
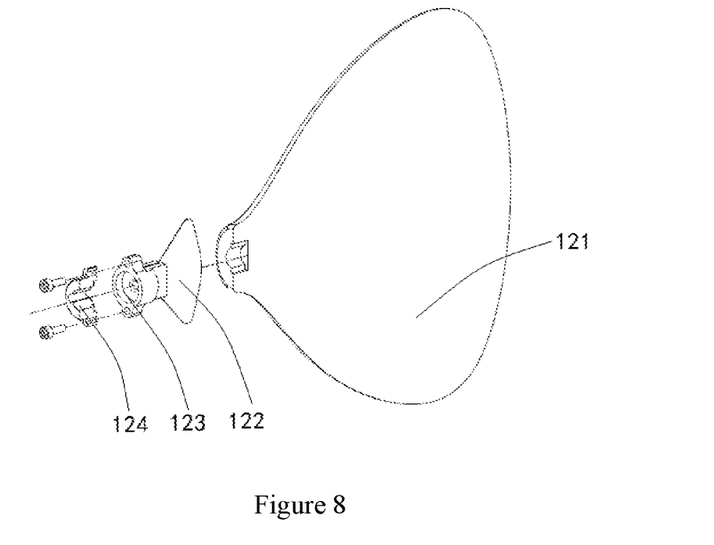
FIG. 8 is an exploded perspective view of the bionic fishtail structure of the single-jointed underwater robot fish.

The mechanism of fish swimming is that high-efficiency thrust is produced through self-oscillation of the tail, and the fishtail is a main actuator that provides the propulsion force to move according to sine traveling waves with the swing enlarged gradually. As shown in FIG. 8, the bionic fishtail structure 120 is comprised of a colloid fishtail 121 and a steel board 122, where the steel 122 is set in the colloidal fishtail 121, and an embedded component 123 at the fishtail is connected to one end, located outside the colloid fishtail 121, of the steel board 122 and is connected with the ejector pin sleeve 346 by the fishtail shaft seat 1234. By arrangement of the ejector pin 345, the ejector pin sleeve 346, and the embedded component 123 at fishtail, the fishtail can be quickly disassembled.

The bionic fishtail structure is designed to fully apply the bionic principle, and simulating the fishtail structure in nature, so that the robot fish can move in a way similar to fish in nature. The fish in nature has a hard spine and soft caudal fin. The fish completely imitates the fishtail of fish in nature. The embedded component 123 at the fishtail and the steel board 122 are used for simulating the spine at the tail to meet the performance requirements for a relatively hard root and the colloidal tail is used for simulating the caudal fin to meet the performance requirements for a soft tail. Thus, the robot fish has the performance of complete simulation of the motion of fish in nature. Preferably, the steel board is 0.08 mm thick and is made of stainless steel.

Figure 9:
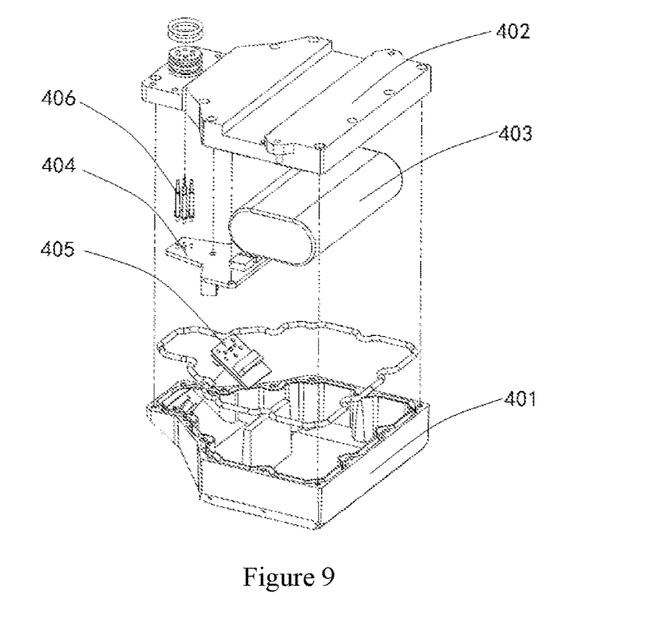
FIG. 9 is an exploded perspective view of the battery cabin of the single-jointed underwater robot fish.
Figure 10:
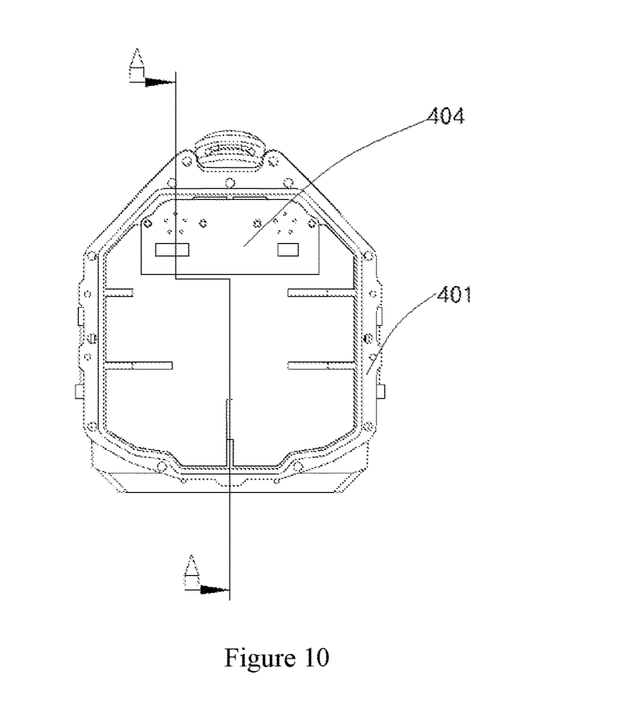
FIG. 10 is the top plan view of the battery cabin casing of the single-jointed underwater robot fish.
Figure 11:
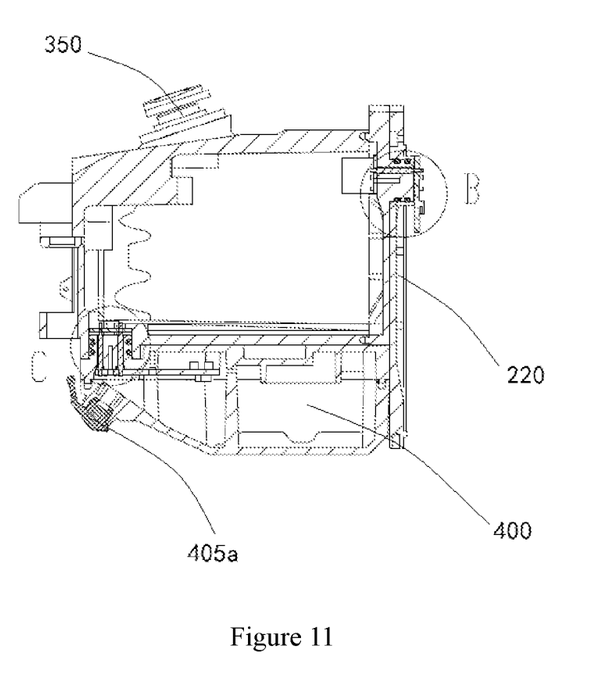
FIG. 11 is a longitudinal sectional view drawing of FIG. 10.
Figure 12:
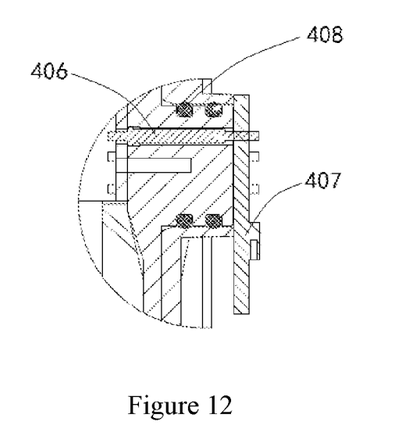
FIG. 12 is an enlarged sectional view drawing of section B of FIG. 11.
Figure 13:
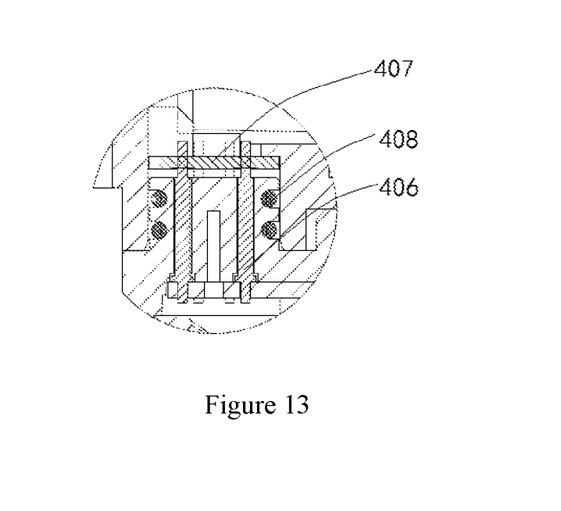
FIG. 13 is an enlarged sectional view drawing of section C of FIG. 11.

As shown in FIG. 9, the bionic fishtail structure is mounted in the process as follows: the boss on the fishtail shaft 344 is aligned with the groove in the shaft seat, the fishtail shaft 344 is pushed inwards until the wedge surface of the ejector pin 345 is brought into contact with the wedge surface of the embedded component 123 at the fishtail, the fishtail is then rotated 90°, and accordingly, clamping can be realized.

As shown in FIG. 9, the battery cabin 400 consists of a battery cabin cover 402, a battery cabin casing 401, a battery 403, a USB circuit board 405, a power management PCB 404, ejector pins, a plurality of screws, and O-rings. The battery cabin casing 401 is provided with an O-groove, a boss with a certain height is set in a corresponding position on the battery case cover 402, the O-ring is placed in the O-groove, and the battery cabin cover 402 and the battery cabin casing 401 are fastened by bolts; the O-ring produces extrusion by means of the joggling structure, and the purpose of waterproofing is achieved. The battery 403 provides power for the robot fish; the USB port 405a realizes the function of battery charging and the function of extraction of shooting data of users; the power management PCB 404 enables the battery 403 to provide a stable power supply for the robot fish.

Figure 14:
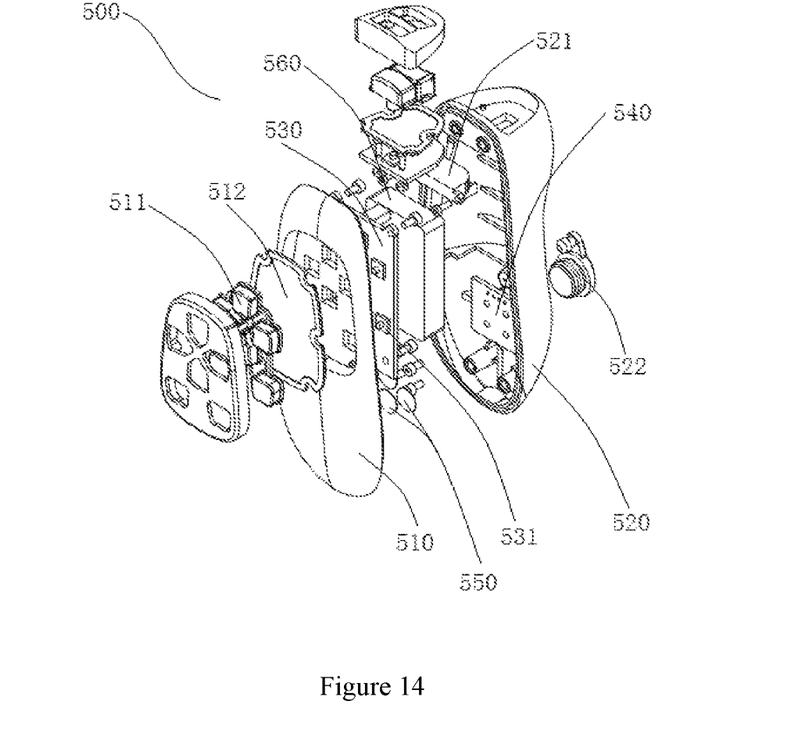
FIG. 14 is an exploded perspective view of a sonic remote control of the single-jointed underwater robot fish.

As shown in FIG. 14, a single-jointed underwater robot fish further is comprised of a sonic remote control 500. The sonic remote control 500 is comprised of a casing, a plurality of keys 511 and a circuit board 530; the casing of the sonic remote control 500 can be split into an upper casing cover 510 and a lower casing cover 520; the plurality of keys 511 are mounted into the upper casing cover 510 and then covered with a waterproof film 512, then the upper casing cover 510 and the lower casing cover 520 are buckled together, the upper and lower ends of the upper casing cover 510 and the lower casing cover 520 are connected by screws, and quasi-integration of the appearance of the casing of the sonic remote control 500 is realized. In addition, the upper casing cover 510 and the lower casing cover 520 are joined with silicone to achieve waterproofing, the silicone is set in the joint between the upper casing cover 510 and the lower casing cover 520, and the upper casing cover 510 and the lower casing cover 520 are tightly connected. Switching elements 531 on the circuit board 530 are set between the plurality of keys 511 and the circuit board 530. During use, after the keys 511 are pressed, the lower ends of the keys 511 touch the switching elements 531 on the circuit board 530, and instructions by the corresponding keys 511 can be emitted. In addition, the keys 511 and the circuit board 530 are waterproofed with a waterproof film 512, water leakage is prevented when the switch is pressed, and the sealing performance is further enhanced.

As shown in FIG. 14, the sonic remote control 500 is provided by a charging board 540 mounted at the charging port end of the bottom of the sonic remote control 500; a silicone stopper is adopted for waterproofing and is opened during charging, and a charging cable is inserted. In addition, each key 511 corresponds to a control instruction having the eight functions of acceleration, deceleration, floating, dive, left turning, right turning, picture taking and shooting. Therefore, the plurality of keys 511 comprise an acceleration key, a deceleration key, a floating key, a dive key, a left turning key, a right turning key, a shooting key and shooting keys. In order to ensure the performance of the sonic remote control 500, the circuit board 530 is secured against the lower casing cover 520 by screws.

The sonic remote control sends instructions to the receiving end by buzzers 550 at different frequencies to realize control. The six buzzers 550 are circular and have the diameter being 8 mm. The receiving end is the acoustic microphone 215 located in the robot fish casing. In order to secure a stable power supply to the battery 560 in the sonic remote control 500, a vertical supply battery baffle 521 is set on the inner side of the lower casing cover 520 to secure the supply battery 560, so that the supply battery cannot fall out due to shaking.

The single-jointed underwater robot fish can realize an underwater exploration function by using the lens group 230 and GPS positioning, and performs underwater exploration by GPS navigation and transmits data back for analysis; the single-jointed underwater robot fish can be used as pioneer underwater salvage equipment, collects video image data and then transmits the data to the ground for actual salvage or carrying a mechanical arm for real-time salvage; an underwater communication transmitting and receiving device is set in the main board cabin 200 and can be adopted as an underwater communication base station; of course, the single-jointed underwater robot fish can also be used as a carrier equipped with sea rescue items, and can provide items for victims of the sea to fight for rescue time.

In the description of the invention, the following content is needed to be understood: the direction or position relationship indicated by terms such as "center", "longitudinal", "transverse", "length", "width", "thickness", "upper", "lower", "front", "back", "left", "right", "vertical", "horizontal", "top", "bottom", "inside", "outside", "clockwise", "counterclockwise" "axial direction", "radial direction" and "circumference" is based on the accompanying drawings, only for the purpose of facilitating description of the invention and simplifying description, rather than indicating or implying that the device or element shall have that specific direction and are constructed and operated in that specific direction. Therefore, the terms cannot be construed as a limit of the invention.

In addition, the terms "first" and "second" are for description purposes only and cannot be construed as indicating or imposing relative importance or an implied indication of the number of technical characteristics indicated. Thus, the characteristics defined by "first" and "second" can only expressly or implicitly indicate that at least one is included. In the description of the invention, "a plurality of" means at least two, such as two or three, unless otherwise specifically defined.

In the invention, unless otherwise explicitly stipulated and defined, terms such as "install", "connect", "connecting" and "fix" shall be understood in a broad sense; for example, a connection can be a fixed connection or a detachable connection or an integrated connection; the connection can be mechanical connection or electrical connection, can be a direct connection or indirect connection by an intermediate medium, and can be an internal communication of two elements or interaction between two elements, unless otherwise clearly defined. Common technicians in the art can understand the specific meaning of the terms in the invention in accordance with specific conditions.

In the invention, unless otherwise explicitly stipulated and defined, the first characteristic being "upper" or "lower" the second characteristic, can be direct contact between the first characteristic and the second characteristic or indirect contact between the first characteristic and the second characteristic by an intermediate medium. Moreover, the first characteristic being "on", "above", and "upper" the second characteristic, can indicate that the first characteristic is above or obliquely above the second characteristic, or simply indicates that the level of the first characteristic is higher than that of the second characteristic. The first characteristic being "under", "below", and "underneath" the second characteristic, can indicate that the first characteristic is below or obliquely below the second characteristic, or only indicates that the level of the first characteristic is lower than that of the second characteristic.

In the description of the specification, reference terms such as "one embodiment", "some embodiments", "examples", "specific examples", or "some examples" imply that specific characteristics, structures, materials or features described by the embodiments or examples, are included in at least one embodiment or example of the invention. In the specification, the illustrative expressions of the preceding terms need not be directed at the same embodiment or example. Moreover, the specific characteristics, structures, materials or features described may be combined in any one or more embodiments or examples. In addition, those skilled can combine and integrate different embodiments or examples in accordance with features of the different embodiments or examples without contradictory circumstances.

While the embodiments of the invention are shown and described, the embodiments can be understood as exemplary instead of limiting, and common technicians in the art can change, modify, substitute, and transform the embodiments within the scope of the invention.

The invention claimed is:

1. A single-jointed underwater robot fish, comprising:
 a casing having an outer contour of a bionic fish shape, wherein one end is a front casing, wherein the other end is a bionic fishtail structure, and wherein the front casing and the bionic fishtail structure are connected by an upper casing and a lower casing;

a main board cabin, wherein a front end of the main board cabin is fitted to the inner side of the front casing, wherein a lens group for collecting images, an eccentric anti-shake mechanism for preventing side shake, a main PCB for controlling the motion trajectory and posture, are set in the main board cabin, and wherein the lens group is connected to the eccentric anti-shake mechanism;

a motion control cabin connected to the rear of the main board cabin, wherein a triaxial linkage device for achieving balance adjustment of the pitch posture and left-right postures and a transmission device are set in the motion control cabin, wherein an output of the transmission device is connected to the bionic fishtail structure, and wherein an input of the transmission device is connected with the output of the triaxial linkage device; and a battery cabin located below the motion control cabin, wherein a lower end of the battery cabin is fixed to the inside of the lower casing, wherein the battery cabin provides a power supply for the main board cabin and the motion control cabin.

2. The single-jointed underwater robot fish, as described in claim 1, wherein the front casing and the upper casing and the upper casing and the lower casing are all sealed connections, and wherein the bionic fishtail structure with one joint penetrating between the upper casing and the lower casing, is located in the casing.

3. The single-jointed underwater robot fish, as claimed in claim 1, wherein the main board cabin is comprised of a main board cabin casing and a cover board, wherein a hole allowing the lens group to collect images is set in the front end of the main board cabin casing, wherein an infrared distance meter is set under the first hole, wherein illuminating lamps are set symmetrically on both sides of the infrared distance meter, wherein indicator lamps are set above the first hole, wherein an acoustic microphone is mounted at the lower end of the main board cabin casing, wherein the eccentric anti-shake mechanism is affixed to the bottom end of the main board cabin, and wherein the lens group is connected with the upper end of the eccentric anti-shake mechanism.

4. The single-jointed underwater robot fish, as claimed in claim 3, wherein the eccentric anti-shake mechanism is comprised of a brushless motor, a U-shaped clamp, a monorail bilateral guard board, a front fan-shaped rail, and a backing board, being stacked from bottom to top sequentially, wherein the brushless motor is affixed to the main board cabin casing through a motor fixing seat, wherein the U-shaped clamp is connected to the upper end of the brushless motor, and wherein the lens group is connected to the eccentric anti-shake mechanism by the backing board.

5. The single-jointed underwater robot fish, as claimed in claim 4, further comprising:

a groove accommodating the front fan-shaped rail is set in the middle of the monorail bilateral guard board, wherein the middle of the front fan-shaped rail is embedded in the groove, and wherein both ends of the front fan-shaped rail are connected to the main board cabin casing by screws.

6. The single-jointed underwater robot fish, as claimed in claim 4, further comprising:

a waterproof assembly of the pressure sensor being set at the lower end of the main board cabin casing (210) and comprised of a pressure sensor outer cover, an inner ejector board, a pressure sensor PCB and a pressure sensor backing board being stacked from bottom to top, sequentially, and connected inside of the pressure sensor outer cover.

7. The single-jointed underwater robot fish, according to claim 1, wherein the triaxial linkage device is comprised of a bracket, a slider, a crank-link mechanism, a side tilting steering gear, and a front-back tilting steering gear, wherein a fixing board is set at the upper part of the bracket, wherein two parallel sliding rods are set at the lower part of the bracket and are sleeved with the slider, wherein a link of the crank-link mechanism is connected with the slider, wherein a crank for the crank-link mechanism is connected to the fixing board, wherein the front-back tilting steering gear is affixed on the upper surface of the fixing board, and wherein the side tilting steering gear is set at the end of the fixing board.

8. The single-jointed underwater robot fish, as claimed in claim 7, wherein the transmission device is comprised of a fishtail shaft, the first umbrella gear, the second umbrella gear, and an ejector pin, with an ejector pin hole, perpendicular to the fishtail shaft, being set in the middle of the fishtail shaft, wherein the ejector pin penetrates the ejector pin hole and is connected to the fishtail shaft by a screw, wherein an ejector pin sleeve is set outside the ejector pin and connected with the bionic fishtail structure, wherein the first umbrella gear is located at one end of the fishtail shaft, and wherein the second umbrella gear is engaged with the first umbrella gear and connected with an output shaft of the fishtail steering engine.

9. The single-jointed underwater robot fish, as claimed in claim 8, wherein the bionic fishtail structure is comprised of a colloidal fishtail and a steel board, wherein the steel board is set in the colloidal fishtail, wherein an embedded component at the fishtail is connected to the end, outside the colloidal fishtail, and wherein the embedded component at the fishtail is connected with the ejector pin sleeve by a fishtail shaft seat.

10. The single-jointed underwater robot fish, according to claim 1, wherein the battery cabin is comprised of a battery cabin casing, a battery cover, a battery, a power management PCB and a USB circuit board, wherein a USB port connected to the USB circuit board, is set on one side of the battery cabin casing, and wherein the power management PCB is connected with the battery cover by spring ejector pins.

11. The single-jointed underwater robot fish, as claimed in claim 3, wherein a second through hole, corresponding to the first hole, is set at the front end of the front casing, and wherein a lens hood is set outside the first hole and penetrates the second hole.

12. The single-jointed underwater robot fish, according to claim 1, further comprising:

a sonic remote control, wherein the sound wave remote control is provided with a plurality of, wherein a circuit board is set in the sonic remote control, and wherein switching elements on the circuit board are set between the plurality of keys and the circuit board.

* * * * *